United States Patent [19]

Schmitz et al.

[11] Patent Number: 5,824,713

[45] Date of Patent: Oct. 20, 1998

[54] FOAMABLE TWO-COMPONENT MATERIAL BASED ON POLYURETHANE

[75] Inventors: Franz Peter Schmitz, Vatersletten; Kai Horeis, Munich; Ramzi Razzak, Mammendorf, all of Germany

[73] Assignee: H.B. Fuller Licensing & Financing Inc., St. Paul, Minn.

[21] Appl. No.: 464,797

[22] PCT Filed: Dec. 23, 1993

[86] PCT No.: PCT/EP93/03671

§ 371 Date: Aug. 15, 1995

§ 102(e) Date: Aug. 15, 1995

[87] PCT Pub. No.: WO94/14865

PCT Pub. Date: Jul. 7, 1994

[30] Foreign Application Priority Data

Dec. 24, 1992 [DE] Germany .......................... 92 17 694 U

[51] Int. Cl.⁶ .............................. C08J 9/00; G08G 18/08
[52] U.S. Cl. ...................... 521/155; 521/172; 521/173; 521/174
[58] Field of Search ................... 521/155, 172, 521/173, 174

[56] References Cited

U.S. PATENT DOCUMENTS 4,412,013  10/1983  Chang ..................................... 521/121

FOREIGN PATENT DOCUMENTS

| 0 196 852 | 10/1986 | European Pat. Off. . |
| 0 355 001 | 2/1990 | European Pat. Off. . |
| 0 380 088 | 8/1990 | European Pat. Off. . |
| 0 452 754 A2 | 10/1992 | European Pat. Off. . |
| 2 237 945 | 7/1974 | France . |
| 1 808 821 | 6/1970 | Germany . |
| 15 94 266 | 2/1971 | Germany . |
| 40 11 060 C1 | 4/1990 | Germany . |
| 893 075 | 4/1962 | United Kingdom . |

OTHER PUBLICATIONS

G. Oertel; Kunststoff Handbuch, Polyurethane, 2. Auflage, Bd. 7 (1983) p. 79.

G. Oertel; Kunststoff Handbuch, Polyurethane, 2. Auflage Bd. 7 (1983) pp. 76, 77.

Primary Examiner—John M. Cooney, Jr.
Attorney, Agent, or Firm—Nancy N. Quan

[57] ABSTRACT

The invention relates to a foamable two-component material based on polyurethane, which can be used, for example, to produce freely foamed seals on a surface or in a groove. Furthermore, the invention relates to specific individual components of this material as well as to objects made of such a material.

An essential aspect of the inventive solution is the feature of forming a two-component material of the type in question, such that one component (A) is a polymer which essentially has only two hydroxyl groups per molecule, and the other component (B) is an isocyanate component which likewise is essentially bi-functional. Customary other additives can be provided as necessary.

34 Claims, No Drawings

FOAMABLE TWO-COMPONENT MATERIAL BASED ON POLYURETHANE

The invention relates to a foamable two-component material based on polyurethane, which can be used, for example, to produce freely foamed seals on a surface or in a groove. Furthermore, the invention relates to specific individual components of this material as well as to objects made of such a material.

Polyurethane foam seals, which are produced in situ at the place where they are used, from their components, by the free expansion of the polyurethane material, have been known for a long time (compare DE 15 94 266 C3, DE-OS 18 08 821). With this technique—as also in the production of other polyurethane foams—expansion takes place at the same time as the chain lengthening reaction; the expanded structure is so-to-speak fixed as a consequence of the polymer build-up and cross-linking reactions. In principle, the following can be considered as components for producing the foam:

As component A: All compounds with at least two Zerewitinov-active H atoms, such that the properties of the finished products can be varied very greatly by means of the structure of the components and their chain length;

As component B: All compounds containing at least two isocyanate groups (NCO groups), which can react with the Zerewitinoff-active H atoms of component A; especially preferred are poly-isocyanates based on 4,4'-diphenyl-methane-di-isocyanate (MDI).

Previously, the expansion was generally effected by physical means, but for some time the trend has increasingly been to let the gas needed for the expansion be generated in situ by a chemical reaction. In this way, the fluoro-chloro-hydrocarbons, which are ecologically objectionable because they destroy ozone, could be replaced by carbon dioxide, which is much less damaging. With FIPM systems (Foam In Place Materials, in situ foamed materials) this has in the meantime also become the state of the art. Products are known which can be foamed in grooves due to their low viscosity, as well as products which can be foamed freely on variously shaped surfaces due to their thixotropic properties. The components are processed by means of mixing and dosing systems; the mixing process itself takes place in dynamic or static mixing chambers.

The free surface of materials foamed in this way is formed by an integral skin. With hardnesses above about 50 Shore A units, they generally have material strength properties which are certainly sufficient for their purpose; in most cases, this also applies to the notch impact strength and tearing strength of the integral skin. However, the softer the material, the less is the mechanical strength of the integral skin. Until now, no material was known, which could be produced by the described methods, and which, with Shore A hardnesses less than 5, would have a similar or comparable elongation on rupture as materials with Shore A hardnesses in the range of 40. The tear propagation strength of the known FIPM systems is generally low and unsatisfactory.

It is therefore an object of the invention to specify a foamable, two-component material of the type mentioned in the introduction, which makes it possible to produce foamed products with a high elongation on rupture and with a good tear propagation strength, even in conjunction with low hardness.

Another object of the invention is to furnish special individual components, pre-polymers, and the like, for such a two-component material.

It is also an object of the invention to specify foamed materials of this type, with an integral skin that has especially high mechanical strength and tearing strength.

The characteristics of the independent claims serve to achieve this object, while the dependent claims define the preferred embodiments. An essential aspect of the inventive solution is the feature of forming a two-component material of the type in question, such that one component (A) is a polymer which essentially has only two hydroxyl groups per molecule, and the other component (B) is an isocyanate component which likewise is essentially bi-functional. Customary other additives can be provided as necessary.

Without intending to be bound to a particular theory, the invention assumes, when choosing suitable components for the inventive foamable system, that the mechanical and physical properties of polyurethanes are determined very significantly by the degree of cross-linking, by the number and relative arrangement of the urethane groups, and by the frequency of branch points in the chain structure.

In the case of polyurethane foams, the parameters which significantly affect their properties, also include the number and relative arrangement of urea groupings.

In this way, the elasticity can be adjusted in a desirable manner by suitably changing the above parameters: As the number of cross-linkage points and the number of polar as well as hydrogen-bridge interactions rises, the elasticity declines, until, in the extreme case, a rigid structure is formed. On the other hand, if the number of cross-linkage points is reduced, the products become more elastic. This increased elasticity can be achieved, according to the invention, by increasing the proportion of bi-functional reaction components relative to the multi-functional reaction components and by reducing as much as possible the number of hydroxyl groups and other reactive groups; by using longer parallel chain segments, by introducing non-reactive side chains, or by a combination of various such and supplementary other parameters which become clear from the following description of preferred embodiments and from the claims.

Surprisingly it has been found that when these ideas are applied to freely foamed (i.e. not produced in a mold) polyurethane materials, not only is the elasticity of the material improved but the elongation on rupture, the tear propagation strength and the strength of the integral skin also increase substantially. For example, it is thus possible according to the invention to produce freely foamed seals which can be adjusted to a great softness (Shore A hardness less than 5) and at the same time have excellent mechanical strength, far superior to known products. Especially surprising is the great mechanical strength of the integral skin of such freely foamed products.

The inventive systems are especially advantageous for producing seals which are formed, for example, by applying the mixed but as yet not reacted components A and B on the part that is to be sealed, where the seal is then formed in situ.

However, the invention can also be used advantageously to produce seals which are formed by applying the mixed but not yet reacted components A and B to a mold, from which the finished seal can be withdrawn and used. The invention is furthermore advantageously suited to produce coatings at the site of their use, especially by the free foaming of an inventive mixture of components A and B. These coatings can be produced on flat surfaces, as well as on substrates with other shapes. For example, the invention can be used to surface coat cylindrical parts such as hoses and pipes. The liquid, mixed two-component material can be applied before the reaction, for example, by pouring or spraying. Both dynamic and suitable static mixing elements can be used to mix the components.

Application of the inventive systems naturally is not limited to the production of seals and coatings; rather, the invention can be used for all applications where great mechanical strength of the foamed material, especially of a decidedly soft material, is important.

The inventive component A can comprise one or more polyols, including their mixtures with one another and with other ingredients.

A first basic type of preferred polyol for the component A is based on poly-ethers and their derivative products. According to the invention, liquid poly-ethers based on e.g. ethylene oxide, propylene oxide, tetra-hydro-furane, as well as the corresponding co-poly-ethers, which are liquid at room temperature, are especially suitable. The (co-) poly-ether can be arranged to have grafted side chains which are derived from acryl-nitrile- or styrene-monomers.

Another basic type of preferred polyol for component A is based on polyesters and their derivative products. Among these, aliphatic polyesters which melt below about 20° C. are preferred at this time, such as e.g. poly-alkylene adipates and poly-alkylene carbonates.

Further, preferred polyol components include poly-alkenes equipped with hydroxyl groups, such as e.g. OH-group-derivatized poly-butadiene, which is liquid at room temperature.

As chain extenders, the polyol component can advantageously contain diols such as e.g. butanediol, hexanediol, and the like, di-amines with a low molecular weight, such as e.g. di-amino-hexane, polyols with a low molecular weight and terminated with amino groups (e.g. bi-functional Jeffamines®); the polyol component A advantageously can also comprise (generally in small relative proportions) such multi-functional compounds as have more than two Zerewitinov-active protons, such as especially e.g. tri-ethanol-amine, tri-methylol-propane, pentaerythritol, Texacat® DPA, tri-functional Jeffamine® and amine-end-capped polyols such as e.g. the products marketed under the designation Polamine®.

The component A can advantageously contain e.g. dispersed poly-urea. Furthermore, the component A can contain other customary additives, even in large amounts, such as catalysts, pigments, thixotropic agents, dispersed and dissolved inorganic and organic compounds and hydrophobic agents. Furthermore, component A usually contains at least an amount of water sufficient for the foaming reaction. Component B preferably contains one or more isocyanate compounds of the following types, which are listed as examples:

Pre-polymers such as Desmodur® PF, Mondur®, or Isonate® M 342, which are reaction products of di-phenyl-methan-di-isocyanateordi-phenyl-methan-di-isocyanate-oligomers with di- and/or tri-propylene-glycol Reaction products of such pre-polymers with a molar deficit of polyols Reaction products of di-phenyl-methan-di-isocyanate with a molar deficit of longer-chained, essentially bi-functional, polyols Uretoniomine-modified di-phenyl-methane-di-isocyanate derivatives, such as e.g. Suprasec® 2020 or Desmodur® CD, whose modification consists especially in the introduction of side groups or side chains Reaction products of such modified isocyanates with a molar deficit of polyols.

Other analogously formed isocyanate-compounds can likewise be used according to the invention. For example, the invention includes the use of appropriate compounds based on other di-isocyanates such as toluylene-di-isocyanate, hexane-di-isocyanate, hydrated di-phenyl-methane-di-isocyanate, iso-phorone-di-isocyanate, and the like.

In addition to one or more of these isocyanate compounds, component B can also contain customary additives such as pigments, thixotropic agents, fillers, and the like.

Instead of this, it is naturally also possible, but generally not useful, to add the above additives to the two-component system only during the mixing process, separately from the polyol ingredients of component A and the isocyanate ingredients of component B.

Among the additives, known in principle, for adjusting the parameters of such two-component systems, the suitable thixotropic agents include especially pyrogenic silicic acid, surface-modified calcium carbonate, and hydrated castor oil, such as e.g. Luvothix® HT. Examples of suitable hydrophobic agents are metal soaps like aluminum stearate or zinc stearate.

In an advantageous embodiment, the amount of polyol compound (s) in component A will be as much as about 99.5%, while the amount of isocyanate compound (s) could be about 50% to 100%.

Component A preferably contains at most 95% and especially preferably 80% to 95% of polyol compound (s) and component B contains preferably 60 to 100%, and especially preferably 80 to 100% of isocyanate compound (s).

Inventive embodiments contain the following additives in component A:

Sufficient to excess water, preferably 0.1 to 5% and especially preferred 0.5 to 2% water;

0–5%, preferably 0–2%, especially preferably 0–1% catalyst

0–3%, preferably 0–2%, especially preferably 0–1.5% pigment

0–30%, preferably 0–20%, especially preferably 0–10% thixotropic agent

0–50%, preferably 0–40%, especially preferably 0–30% at least one dispersed inorganic solid 0–70%, preferably 0–50%, especially preferably 0–30% at least one dissolved inorganic or organic solid 0–95%, preferably 0–70 %, especially preferably 0–50% at least one non-reactive organic compound 0–50%, preferably 0–40%, especially preferably 0–30% a chain extender with a low molecular weight 0–25%, preferably 0–10%, especially preferably 0–5% a multi-functional Zerewitinoff-active compound 0–20%, preferably 0–15%, especially preferably 0–10% a hydrophobic agent and for component B:

0–40%, preferably 0–30%, especially preferably 0–1% a non-reactive organic compound 0–3%, preferably 0–2%, especially preferably 0–1.5% pigments 0–30%, preferably 0–20%, especially preferably 0–10% thixotropic agent The additive for component A, which is specified as at least one "dispersed inorganic solvent" involves at least in part customary additives such as fillers, especially $CaCO_3$, and possibly also solids for imparting adhesion. Inorganic fire-proofing additives and the like also fall within this category.

The next specification for at least one "dissolved inorganic or organic solid" involves at least in part customary additives such as stretching agents and modifiers for the physical and chemical properties of the foam.

The specification of at least one "non-reactive organic compound" as an additive for components A and B involves e.g. modifiers of the surface properties of the foam (thus especially of the integral skin) such as e.g. propylene carbonate; but it also involves softening agents, dispersed organic fire-proofing agents, and the like.

A preferred procedure is to provide the components always with such amounts of the intended additives that, at the application site, the two-component system need only be mixed and the foaming reaction initiated. The subject of the invention consequently also comprises the individual, additive-enhanced components of the inventive systems. The invention is described in more detail below in terms of some embodiments, which also comprise the best embodiment of the invention that is presently known to the applicant.

First of all, two embodiments were produced of the inventive component A and three embodiments of the inventive component B. As a comparison example, a commercial NCO-component for polyurethane-foam was chosen.

EXAMPLE 1

An inventive component A1 was formed by mixing 88.4% poly-ether-diol Arcol® 1025, 5.0% poly-ether-triol Baycoll® BT 1380, 1.4% tri-ethanol-amine, 0.3% amine catalyst Dabco® 33 LV, 0.1% metal-organic catalyst Irgastab® DBTL, 1.4% water, 0.4% color paste Moltoprene® AUN and 3.0% modified castor oil Luvothix® HT.

EXAMPLE 2

An inventive component A2 was formed by mixing 92.4% poly-ether-diol Arcol® 1025, 1.6% tri-ethanol-amine, 0.3% amine catalyst Dabco® 33 LV, 0.2% metal-organic catalyst Irgastab® DBTL, 1.4% water, 0.5% color paste Moltoprene® AUN and 3.0% surface-modified calcium carbonate Winnofil® SPT and 0.6% pyrogenic silicic acid HDK N 20.

EXAMPLE 3

For comparison component A3 was formed by mixing 69.3% high molecular weight poly-ether-triol Baycoll® BT 5035, 8.0% poly-ester-diol Baycoll® 1280, 10.0% hydroxyl-terminated poly-butadiene Liquiflex®, 10.0% aliphatic polyester Bester® 105, 1.0% tri-ethanol-amine, 0.3% amine catalyst Dabco® 33LV, 0.2% metal-organic catalyst Irgastab® DBTL, 0.7% water, 0.5% color paste Moltoprene® AUN and 0.5% pyrogenic silicic acid HDK N 20.

EXAMPLE 4

As inventive component. B1 an isocyanate-terminated pre-polymer was used, which is obtainable commercially under the designation Desmodur® PF as an NCO component for flexible, unfoamed polyurethanes.

EXAMPLE 5

As inventive component B2, an isocyanate-terminated pre-polymer consisting of 64.8% weight percent of the component B1 of Example 4, 34.9% poly-ether-triol Baycoll® 5035 with a high molecular weight, and 0.1% stabilizer (benzoyl chloride) was used.

EXAMPLE 6

As inventive component B3, a uretonimine-modified di-phenyl-methane-di-isocyanate with a functionality of 2.05 to 2.2 was used, which is available commercially under the designation Suprasec® VM 205.

EXAMPLE 7

For comparison, component B4 was a commercially available product called "Hardener 302" of H. B. Fuller GmbH Munich. This is a di-isocyanate-component, corresponding to the prior art, for conventional polyurethane foam seals.

The components of examples 1 to 7 were mixed in a dynamic mixing chamber of a two-component mixing and dosing system of conventional construction type, and were removed. Care was taken that the A component was sufficiently "loaded" with air to achieve nucleation for the formation of foam.

The following mixing ratios were used:

| A1/B1 | 100:42 | A2/B1 | 100:50 | A3/B1 | 100:30 |
|---|---|---|---|---|---|
| A1/B2 | 100:70 | A2/B2 | 100:75 | A3/B2 | 100:50 |
| A1/B3 | 100:23 | A2/B3 | 100:24 | A3/B3 | 100:23 |
| A1/B4 | 100:18 | A2/B4 | 100:20 | A3/B4 | 100:20 |

These mix ratios correspond to the following ratios of (polyol OH)/NCO and of (polyol OH plus water OH)NCO:

| Mixture | (Polyol OH)/NCO | (Polyol OH plus water OH)/NCO |
|---|---|---|
| A1/B1 | 9 | 42 |
| A1/B2 | 14 | 66 |
| A1/B3 | 7 | 33 |
| A1/B4 | 6 | 31 |
| A2/B1 | 8 | 41 |
| A2/B2 | 14 | 68 |
| A2/B3 | 7 | 33 |
| A2/B4 | 6 | 31 |
| A3/B1 | 8 | 33 |
| A3/B2 | 30 | 54 |
| A3/B3 | 15 | 26 |
| A3/B4 | 14 | 24 |

The mixtures obtained in this way produced foamed poured parts with a diameter of about 10 cm and a height of about 4 cm. After foaming was completed, these products were subjected to various tests.

The Shore A hardness test was performed according to DIN 53505.

The Shore 00 hardness was measured analogous to the Shore A hardness with a Shore 00 measuring device.

An edge test was performed in such a way that the foamed poured parts were pulled over a rounded metal edge so that the poured part was kinked off at an angle of 90°. During this process, the foam was compressed at the edge by about 70%. The edge test was considered as having been passed if the surface of the poured part subsequently did not exhibit any cracks. If the surface exhibited particularly minimal traces of mechanical stress, the edge test was considered as "having been passed very well".

A puncture test was then performed in such a way that a poured part of the type described above was completely compressed by a rounded tip with a diameter of 2 mm. The test was considered as having been passed if the skin of the poured part remained undamaged and in particular was not perforated. Here, too, products with conspicuously minimal traces of stress were characterized by the predicate "passed very well".

The density of the foam was measured in accordance with DIN 53420. The elongation on rupture and the tensile strength were measured with reference to DIN 53571 by means of a Zwick Universal Test Unit 1455, with a measurement length of 50 mm, a test speed of 500 mm/min, and a foam dimension in the measurement region of 13 mm with a 10 mm thickness.

In these tests, the elongation on rupture was measured in percent, the tensile strength in N/mm$^2$.

The results are given in the table below.

| Com-po-nents | | Shore A | Shore 00 | Edge Test | Puncture Test | Com-Density (g/cm$^3$) | Elongation on Rupture % | Tensile Strength (N/mm$^2$) |
|---|---|---|---|---|---|---|---|---|
| A1 | B1 | 1 | 45 | ++ | ++ | 0.12 | 166 | 0.17 |
|    | B2 | 1 | 45 | ++ | ++ | 0.16 | — 1) | — 1) |
|    | B3 | 1 | 45 | + | + | 0.19 | 107 | 0.14 |
|    | B4 | 1 | 40 | − | − | 0.20 | 65 | 0.04 |
| A2 | B1 | 1 | 35 | ++ | ++ | 0.13 | 228 | 0.27 |
|    | B2 | 1 | 40 | ++ | ++ | 0.15 | — 1) | — 1) |
|    | B3 | 1 | 40 | + | + | 0.18 | 136 | 0.18 |
|    | B4 | 1 | 40 | − | − | 0.17 | 68 | 0.06 |
| A3 | B1 | 18 | — 1) | ++ |   | 0.28 | 153 | 0.46 |
|    | B2 | 20 | — 1) | ++ | ++ | 0.28 | — 1) | — 1) |
|    | B3 | 18 | — 1) | + | + | 0.32 | 129 | 0.53 |
|    | B4 | 19 | — 1) | − | − | 0.36 | 73 | 0.44 |

++ passed very well
+ passed
− not passed
1) not measured

As the results show, all combinations with components B1, B2 and B3 yield markedly better properties of the integral skin in the edge test and in the puncture test. Especially among the soft products, the elongation on rupture and the tensile strength are noticeably improved in comparison with the products produced by using the commercial component B4.

We claim:

1. A composition prepared by mixing components comprising:
   i) a hydroxyl containing component A comprising sufficient water to form freely foamed objects and at least one polymer polyol which is a diol, component A comprising predominantly one or more diols; and
   ii) component B comprising an isocyanate compound that has an average isocyanate group functionality of about 2; said composition producing freely foamed objects having a Shore hardness A of about 5 or less and a density of 0.32 g/cm$^3$ or less; a tensile strength of about 0.14 N/mm$^2$ or more and an elongation on rupture of 107% or more.

2. A composition as in claim 1 wherein the mix ratio of components (a) and (b) provides a ratio of isocyanate groups to polyol hydroxyl groups from about 1.5:1 to about 6:1, and a ratio of isocyanate groups to total hydroxyl groups from polyol and from water from about 0.7:1 to about 1.2:1.

3. A composition as in claim 1 wherein the density of the of the foam produced thereby is about 0.2 g/cm$^3$ or less.

4. A composition as in claim 1 wherein the polymer polyol of component A consists essentially of a polymeric diol.

5. The composition of claim 1 in which the polymer polyol of component A is selected from the group consisting of a polyether which is liquid at room temperature, a copolyether which is liquid at room temperature, an aliphatic polyester with a melting point less than about 20° C., a polyalkene which is liquid at room temperature, a polyalkadiene which is liquid at room temperature, and mixtures thereof.

6. The composition of claim 3 in which the polyol of component A is selected from the group consisting of polyalkylene adipate and polyalkylene carbonate polyesters; a polybutadiene having OH groups; and polyethers based on a monomer selected from the group consisting of ethylene oxide, propylene oxide, and tetrahydrofuran; and mixtures thereof.

7. The composition of claim 1 wherein the elongation on rupture of the foam produced thereby is at least 80%.

8. The composition of claim 1 in which the isocyanate containing component B consists essentially of a bifunctional isocyanate-terminated prepolymer.

9. The composition of claim 8 in which the bifunctional isocyanate-terminated prepolymer is a compound selected from the group consisting of a reaction product of a compound selected from the group consisting of diphenylmethanediisocyanate and diphenylmethanediisocyanate oligomers with at least one polyol, with a molar deficit of the polyol portion;

a uretonimine-modified diphenylmethanediisocyanate; and the reaction product of a uretonimine-modified diphenylmethanediisocyanate with at least one polyol, with a molar deficit of the polyol portion.

10. The composition of claim 1 which the component (A) contains 80% to 99.5% polyol and the component (B) contains 50% to 100% of an isocyanate terminated prepolymer.

11. The composition of claim 1 wherein:
the component (A) contains, in addition to said polymer polyol, 0.1% to 5% water, 0% to 5% of a catalyst, 0% to 3% of a pigment, 0% to 30% of a thixotropic agent, 0% to 50% of a dispersed inorganic solid selected from the group consisting of filler, an adhesion imparting agent, a fire-proofing agent and mixtures thereof, 0% to 70% of a dissolved inorganic solid, 0% to 70% of a dissolved organic solid, 0% to 95 % of a non-reactive organic compound capable of adjusting the surface properties of the foam, a softening agent, or a fire-proofing agent, 0% to 50% of a chain extender with a low molecular weight, 0 to 25% of a multi-functional Zerewitinoff-active compound and 0 to 20% of a hydrophobic agent, and the component (B) further comprises 0% to 40% of at least one of a non-reactive organic compound capable of adjusting the surface properties of the foam, a softening agent, and a fire-proofing agent, 0% to 3% of pigments and 0% to 30% of a thixotropic agent.

12. The composition of claim 11 wherein said dispersed inorganic solid is CaCO$_3$.

13. The composition of claim 11 wherein said organic solid is selected from the group consisting of stretching agents, additives for modifying the physical properties of the foam, additives for modifying the chemical properties of the foam, and mixtures thereof.

14. The composition of claim 11 wherein said non-reactive organic compound capable of adjusting the surface properties of the foam is propylene carbonates and said thixotropic agent is selected from the group consisting of pyrogenic silicic acid, surface-modified calcium carbonate, hydrated castor oil and mixtures thereof.

15. A polymer foam product produced from the composition of claim 1.

16. A polymer foam product as in claim 15 wherein the foam has a density of 0.2 g/cm$^3$ or less.

17. A polymer foam product as in claim 16 wherein the Shore A hardness of the foam is less than 5; the foam has a tensile strength of about 0.14 N/mm² or more and the foam has an elongation on rupture of at least 107%.

18. A method for producing a polymer foam object comprising introducing a composition as in claim 1 into a mold, allowing the composition to foam within the mold, and subsequently removing the foamed object produced thereby from the mold.

19. A composition produced by blending:

(a) a hydroxyl group containing component A comprising a polymer polyol component consisting essentially of one or more diols or a mixture thereof with one or more triols, and including at least one polymer polyol which has an average hydroxyl group functionality of about 2, and water, component A comprising predominantly one or more diols and (b) an isocyanate group containing component B which comprises an isocyanate functional compound which is essentially bifunctional, the mixture being one which produces a cured free foam product having a Shore A hardness of about 5 or less, an elongation on rupture of about 107% or more, a density of about 0.32 g/cm³ or less, and a tensile strength of about 0.14 N/mm² or more.

20. The composition of claim 19 in which component B is a compound selected from the group consisting of a reaction product of a compound selected from the group consisting of diphenylmethanediisocyanate and diphenylmethanediisocyanate oligomers with at least one polyol, with a molar deficit of the polyol portion;

a uretonimine-modified diphenylmethanediisocyanate; and the reaction product of a uretonimine-modified diphenylmethanediisocyanate with at least one polyol, with a molar deficit of the polyol portion.

21. The composition of claim 20 in which the polymer polyol of component A is selected from the group consisting of a polyether which is liquid at room temperature, a copolyether which is liquid at room temperature, an aliphatic polyester with a melting point less than about 20° C., a polyalkene which is liquid at room temperature, a polyalkadiene which is liquid at room temperature, and mixtures thereof.

22. The composition of claim 21 in which polyol of component A is selected from the group consisting of polyalkylene adipate and polyalkylene carbonate polyesters; a polybutadiene having OH groups; polyethers based on a monomer selected from the group consisting of ethylene oxide, propylene oxide, and tetrahydrofuran; and mixtures thereof.

23. The composition of claim 19 in which component (A) contains 80% to 99.5% polyol and component (B) contains 50% to 100% of an isocyanate terminated pre-polymer.

24. A polymer foam product produced from the composition of claim 19.

25. A composition as in claim 1 wherein component A contains about 0.1 to 5% water.

26. A composition as in claim 1 wherein the foam has an integral skin.

27. A method of producing a polyurethane foam seal comprising the steps of:

a) applying a composition prepared by mixing components comprising:

i) a hydroxyl containing component A comprising sufficient water to form freely foamed objects and at least one polymer polyol which is a diol, component A comprising predominantly one or more diols; and ii) component B comprising an isocyanate compound that has an average isocyanate group functionality of about 2; said composition producing freely foamed objects having a Shore hardness A of about 5 or less and a density of 0.32 g/cm³ or less and a tensile strength of about 0.14 N/mm² or more and an elongation on rupture of 107% or more, to at least one substrate; and b) allowing the composition to foam freely.

28. The polyurethane foam seal formed in accordance with the method of claim 27.

29. The polyurethane foam seal as in claim 28 wherein the seal has an integral skin.

30. The method as in claim 28 further comprising forming the seal in situ by applying the mixed but unreacted components A and B to at least one substrate.

31. The method as in claim 28 further comprising applying the mixed but unreacted components A and B to a mold from which the seal can be withdrawn.

32. A composition prepared by mixing components comprising:

a) a hydroxyl containing component A comprising sufficient water to form freely foamed objects; and at least one polymer polyol selected from the group consisting of a polyether polyol which is liquid at room temperature, a polyesterether polyol which is liquid at room temperature, an aliphatic polyester polyol with a melting point less than about 20° C., a polyalkene polyol which is liquid at room temperature, a polyalkylene diol which is liquid at room temperature and mixtures thereof; and b) component B comprising an isocyanate selected from the group consisting of diphenylmethanediisocyanate, diphenylmethanediisocyanate oligomers, uretonimine-modified diphenylmethanediisocyanate and mixtures thereof;

said composition producing freely foamed objects having a Shore A hardness of about 5 or less and a density of about 0.32 g/cm³ or less and a tensile strength of about 0.14 N/mm² or more and an elongation on rupture of 107% or more.

33. A composition as in claim 30 wherein component A contains about 0.1 to 5% water.

34. A composition as in claim 30 wherein the foam has a tensile strength of about 0.14 N/mm² or more, an elongation on rupture of at least about 107% and an integral skin.

* * * * *